W. H. BURNS.

Assignor, by mesne assignments, to J. H. PROUTY & S. S. SPRAGUE.

Loom-Temple.

No. 8,956. Reissued Nov. 4, 1879.

Witnesses.

N. E. Whitney.

L. F. Connor.

Inventor.

William H. Burns by Crosby & Gregory Attys.

N. PETERS, PHOTO-LITHOGRAPHER, WASHINGTON, D. C.

UNITED STATES PATENT OFFICE

WILLIAM HENRY BURNS, OF WORCESTER, MASSACHUSETTS, ASSIGNOR, BY MESNE ASSIGNMENTS, TO JOEL H. PROUTY AND SOLON S. SPRAGUE, OF SAME PLACE.

IMPROVEMENT IN LOOM-TEMPLES.

Specification forming part of Letters Patent No. 192,897, dated July 10, 1877; Reissue No. 8,956, dated November 4, 1879; application filed March 27, 1879.

DIVISION A.

*To all whom it may concern:*

Be it known that I, WILLIAM HENRY BURNS, of Worcester, in the county of Worcester and State of Massachusetts, have invented certain new and useful Improvements in Loom-Temples; and I do hereby declare the following to be a full, clear, and exact description thereof, reference being had to the accompanying drawings, and to the letters of reference marked thereon.

The nature of my invention consists in the construction of a toothed roller to be used in loom-temples, as will be hereinafter more fully set forth.

In order to enable others skilled in the art to which my invention appertains to make and use the same, I will now proceed to describe its construction and operation, referring to the annexed drawings, which form a part of this specification, and in which—

Figure 1:
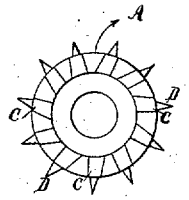
Figure 2:
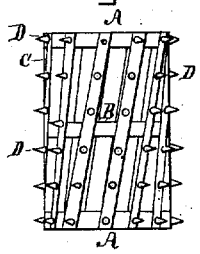
Figure 3:
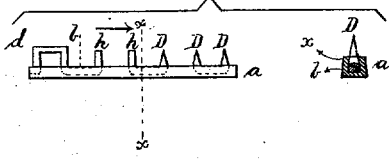

Figure 1 is an end view of my improved roller for loom-temples. Fig. 2 is a plan view of the same; and Fig. 3 is a detailed view, showing the mode of making the toothed bars.

A A represent the two ends or heads of the roller, and B a center head, all having central apertures for the passage of the screw or pivot on which the roller revolves.

The heads A A and B are connected by means of a series of bars, C C, passed through slots in their edges at suitable equal distances apart. These bars are set inclined, and dovetailed in the heads, as shown, and are provided with a series of points or teeth, D.

The bars C, with their teeth D, are constructed in the following manner: A metal strip, *a*, of suitable dimensions, is bent lengthwise nearly double, so as to form a longitudinal groove, and in this groove is placed a corrugated wire, *b*, which wire is then fastened by filling the groove with solder *x*. It will then be seen that the wire outside of the metal strip presents the appearance of a series of staples, *d*, as shown in Fig. 3. The ends (or, more properly speaking, the centers) of these staples are cut off, leaving a series of blunt points, *h*. These points are afterward, by a suitable instrument, pointed, forming the completed teeth D. It will then be seen that the teeth are arranged in pairs, each pair being in one piece, and held in the metal strip by the solder *x*, making them more firm and durable than could be done if said teeth were inserted separately. The bars C, with their teeth D, are thus also made cheaply, and, when necessary, any one or more of said bars can be easily removed from the roller and others substituted in their places. These rollers are used for the same purpose as other loom-temples, and the slanting or inclined position of the toothed bars has a tendency to draw the fabric outward or stretch the same sidewise as it is beaten up.

Having thus fully described my invention, what I claim as new, and desire to secure by Letters Patent, is—

1. In a roller for loom-temples, a toothed bar having the teeth arranged in pairs, each pair being in one piece, and fastened substantially in the manner and for the purposes herein set forth.

2. A roller for loom-temples, consisting of the heads A A and B, having notches or grooves in their edges, as described, the inclined bars C C, placed in said notches or grooves, and the teeth D D, fastened in said bars, all constructed substantially as and for the purposes herein set forth.

WILLIAM HENRY BURNS.

Witnesses:

CHARLES A. KING,

C. H. ROBINSON.